US008101318B2

United States Patent
Minas et al.

(10) Patent No.: US 8,101,318 B2
(45) Date of Patent: Jan. 24, 2012

(54) METHOD FOR FUEL CELL ASSEMBLY WITH SPRINGS AND PINS

(75) Inventors: Constantinos Minas, Slingerlands, NY (US); Megan A. Fannon, Latham, NY (US); Russ Marvin, Goshen, CT (US); Charles M. Carlstrom, Jr., Saratoga Springs, NY (US); Robert S. Hirsch, Troy, NY (US); Sampath Venkataswamy, Menands, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 767 days.

(21) Appl. No.: 11/606,726

(22) Filed: Nov. 30, 2006

(65) Prior Publication Data
US 2008/0131753 A1 Jun. 5, 2008

(51) Int. Cl.
H01M 8/00 (2006.01)
H01M 2/00 (2006.01)
H01M 2/08 (2006.01)

(52) U.S. Cl. ........ 429/507; 429/400; 429/508; 429/509; 429/535

(58) Field of Classification Search .................. None
See application file for complete search history.

(56) References Cited

U.S. PATENT DOCUMENTS

| 6,057,053 | A * | 5/2000 | Gibb ............................. 429/37 |
| 6,716,550 | B1 | 4/2004 | Kirby |
| 6,761,808 | B1 | 7/2004 | Revill et al. |
| 7,014,953 | B2 | 3/2006 | Menjak et al. |
| 2004/0062976 | A1 * | 4/2004 | Wells et al. ..................... 429/36 |
| 2005/0048349 | A1 | 3/2005 | Fannon |
| 2005/0100775 | A1 | 5/2005 | Rock |
| 2005/0249998 | A1 | 11/2005 | Minas et al. |
| 2006/0142039 | A1 | 6/2006 | Debe et al. |

FOREIGN PATENT DOCUMENTS

EP 1 391 956 A1 2/2004
WO WO-2005/112164 A1 11/2005

OTHER PUBLICATIONS

"Notification of Transmittal of the International Search Report and the Written Opinion of the International Searching Authority, or the Declaration," International Filing Date: Nov. 26, 2007, International Application No. PCT/US2007/024439, Applicant: MTI Micro Fuel Cells Inc., Date of Mailing: Feb. 29, 2008, pp. 1-12.
U.S. Appl. No. 10/792,024, Minas et al.

* cited by examiner

*Primary Examiner* — Melvin Mayes
*Assistant Examiner* — Colin W Slifka
(74) *Attorney, Agent, or Firm* — Cesari and McKenna, LLP

(57) ABSTRACT

A spring loaded direct oxidation fuel cell assembly reduces the effects of precompression relaxation. A near flat spring and a distribution plate form a spring assembly that is disposed between a membrane electrode assembly and one of the current collectors in the fuel cell. The components are assembled into a fuel cell assembly and are precompressed, and a spring yielding process is performed. While precompression is being applied, a set of pins and a plastic frame are insert molded around the fuel cell assembly to hold the components in place. Subsequently, as the precompression relaxes, the spring assembly forces act to maintain an evenly distributed compression on the MEA, thereby compensating for the loss of precompression. A related method of manufacturing a fuel cell assembly is provided.

16 Claims, 10 Drawing Sheets

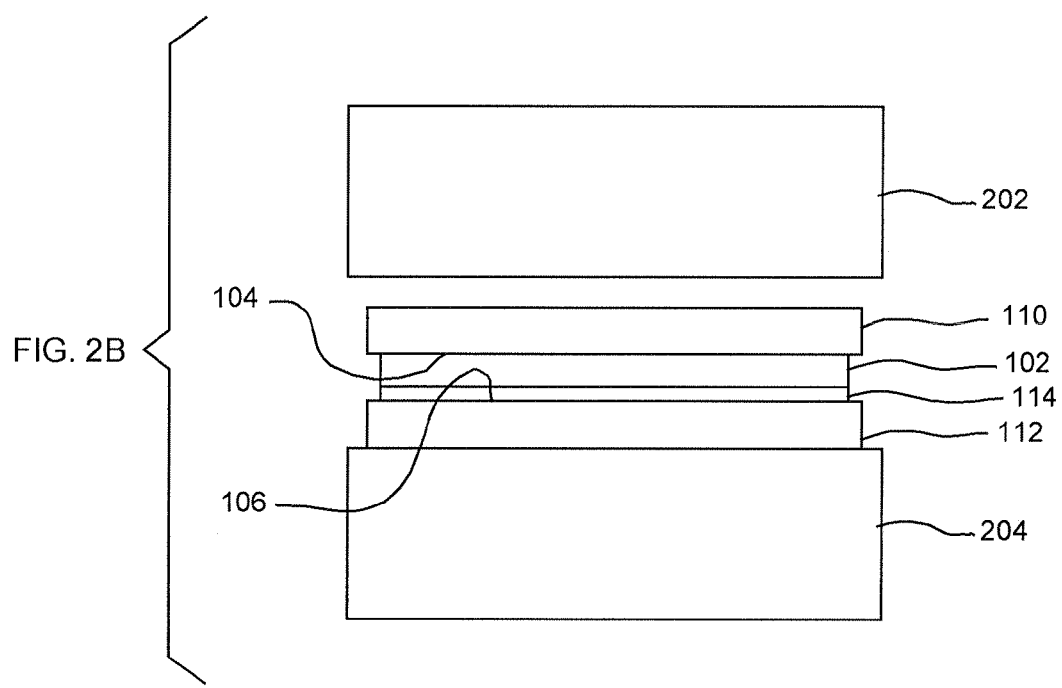

METHOD FOR FUEL CELL ASSEMBLY WITH SPRINGS AND PINS

BACKGROUND OF THE INVENTION

1. Field of the Invention

This invention relates generally to fuel cells and, more particularly, to maintaining a compressed state of the fuel cell.

2. Background Information

Fuel cells are devices in which electrochemical reactions are used to generate electricity. A variety of materials may be suited for use as a fuel depending upon nature of the fuel cell. Organic materials, such as methanol or natural gas, are attractive fuel choices due to their high specific energy.

Fuel cell systems may be divided into "reformer-based" systems (i.e., those in which the fuel is processed in some fashion to extract hydrogen from the fuel before it is introduced into the fuel cell) or "direct oxidation" systems in which the fuel is fed directly into the cell without the need for separate internal or external processing. Most currently available fuel cells are reformer-based fuel cell systems. However, because fuel processing is complex, and requires expensive components, which occupy comparatively significant volume, the use of reformer based systems is presently limited to comparatively large, high power applications.

Direct oxidation fuel cell systems may be better suited for a number of applications in smaller mobile devices (e.g., mobile phones, handheld and laptop computers), as well as in some larger scale applications. In fuel cells of interest here, a carbonaceous fuel, in either liquid or vapor form, including an aqueous solutions (typically aqueous methanol) is delivered to the anode face of a membrane electrode assembly (MEA). The MEA contains a protonically conductive, but electronically non-conductive membrane (PCM). Typically, a catalyst, which enables direct oxidation of the fuel on the anode aspect of the PCM, is disposed on the surface of the PCM (or is otherwise present in the anode chamber of the fuel cell). In the fuel oxidation process at the anode, the products are protons, electrons and carbon dioxide. Protons (from hydrogen in the fuel solution involved in the anodic reaction) are separated from the electrons. The protons migrate through the PCM, which is impermeable to the electrons. The electrons travel through an external circuit, which includes the load, thus providing electrical power from the fuel cell, and are united with the protons and oxygen molecules in the cathodic reaction.

One example of a direct oxidation fuel cell system is a direct methanol fuel cell system or DMFC system. In a DMFC system, a mixture comprised predominantly of methanol or methanol and water (in either liquid or vapor form) is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed at an acceptable rate (more specifically, slow oxidation of the fuel mixture will limit the cathodic generation of water, and vice versa).

Direct methanol fuel cells are being developed towards commercial production for use in portable electronic devices. Thus, the DMFC system, including the fuel cell and the other components should be fabricated using materials and processes that are not only compatible with appropriate form factors, but which are also cost effective. Furthermore, the manufacturing process associated with a given system should not be prohibitive in terms of associated labor or manufacturing cost or difficulty.

Typical DMFC systems include a fuel source, fluid and effluent management and air management systems, and a direct oxidation fuel cell ("fuel cell"). The fuel cell typically consists of a housing, hardware for current collection and fuel and air distribution, and a membrane electrode assembly ("MEA") disposed within the housing. A typical MEA includes a centrally disposed, protonically conductive, electronically non-conductive membrane ("PCM"). One example of a commercially available PCM is NAFION® a registered trademark of E.I. DuPont de Nemours and Company, a cation exchange membrane comprised of polyperfluorosulfonic acid, in a variety of thicknesses and equivalent weights. The PCM is typically coated on each face with an electrocatalyst such as platinum, or platinum/ruthenium mixtures or alloy particles, though other catalyst combinations may also be used. On each face of the catalyst coated PCM, the electrode assembly typically includes a diffusion layer. The diffusion layer on the anode side is employed to evenly distribute the fuel mixture across the anode face of the PCM, while allowing the gaseous product of the reaction, typically carbon dioxide, to move away from the anode face of the PCM. In the case of the cathode side, a diffusion layer is used to achieve a sufficient supply and even distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM. Notably, a passive system in which no external water collection is performed, and instead, water is pushed back from the cathode side to the anode side of a fuel cell is described in commonly owned U.S. patent application Ser. No. 10/413,983 for DIRECT OXIDATION FUEL CELL OPERATING WITH DIRECT FEED OF CONCENTRATED FUEL UNDER PASSIVE WATER MANAGEMENT, of Ren et al., filed on Apr. 15, 2003, which is presently incorporated by reference herein.

As noted, the MEA is formed of a centrally disposed PCM that is sandwiched between two catalyst layers. The catalyst layers of the MEA in some architectures can be arranged such that cathode diffusion layer is adjacent the cathodic catalyst layer to allow oxygen to be transported to the cathode, and liquid effluent managed effectively. An anode 1 diffusion layer is adjacent the anodic catalyst layer that allow fuel to be transported to the anode, and to allow carbon dioxide to travel away from the anode. Gaskets are often used to maintain the catalytic layers and the diffusion layers in place. Generally, the entire MEA is placed into a frame structure that both compresses the MEA and provides an electron path. Although this can provide some dimensional stability, the greater the compression that is required, the more physical components (i.e., screws, etc.) must be employed to assure adequate pressure. Those skilled in the art will recognize that sealing and application of significant pressure can be accomplished in various ways, but these aspects conventionally involve relatively large fastening components, such as screws, nuts and the like. Such components themselves can be expensive because they are specially machined. Furthermore, the assembly of devices that include these fasteners is a time consuming manual process that can also lead to inconsistency in results, as compared to automated commercial volume manufacturing methods. Moreover, the additional parts can add weight, volume and cost to the fuel cell, which if used as a power source for hand-held electronic devices, should be of the smallest form factor possible.

As noted, it is also common to place gasketing around the exterior portions of the fuel cell to resist leaks of the fuel substance or water that is produced at the cathode out of the fuel cell. The gasketing can also be used to retain moisture in the fuel cell, as the NAFION® membrane operates ideally when sufficiently hydrated. The gasketing that is incorporated to prevent leakages is typically a deformable plastic material that is stretched and placed around the outer current conductor plates and usually hand-assembled around the lateral portions of the fuel cell.

In accordance with commonly owned, co-pending U.S. patent application Ser. No. 10/449,271, filed on May 30, 2003, by Hirsch, et al., for a FUEL EFFICIENT MEMBRANE ELECTRODE ASSEMBLY, which is incorporated by reference herein, a direct oxidation fuel cell is described in which the catalyst layers and diffusion layers can be extended beyond and overlap the gasketing to form an even greater seal than the gasketing would alone. In addition, the catalyzed portions of the membrane are extended into the area of the gasket to substantially resist the flow of fuel substance through any paths created at the edges of the diffusion layer between the diffusion layer and the gasket. Extending the catalytic layer into the area of the gasket allows methanol or other fuel substances to be oxidized on the catalyst prior to its leaking out of or around the diffusion layer. These aides prevent undesired leakages; however, such gaskets must be manually placed in the proper location during manufacture. Additionally, the fuel cell still requires the use of screws, bolts and other fasteners to maintain the fuel cell components in place, and to maintain the proper compression required for electrical contact and leakage prevention.

More specifically, fuel cells contain a number of components. These components can include one or more of the following: a fixture or base compression plate, a gasket, an anode current collector plate, a second gasket, a membrane electrode assembly, and yet another gasket, then the cathode current collector, a further gasket and a cathode compression plate. Depending on the design of the current collectors, components be used on either the anode aspect of the MEA or the cathode aspect of the MEA or both. To create and maintain compression through all of the layers, multiple fasteners (typically, four to eight screws and nuts) are often used to create and maintain the compression through the MEA. Typical fuel cell assembly techniques involve layering the components of the fuel cell by hand and then compressing the components together by tightening the screws to achieve a desired compression. As this is accomplished by hand, such a manufacturing technique results in variations in compression from build to build, in addition to consuming significant assembly time per cell. In addition to DMFCs, other types of fuel cells, such as hydrogen-gas fueled fuel cells, conventionally require these manufacturing techniques, and have the same disadvantages.

Some of the disadvantages of these techniques are addressed in commonly-owned U.S. patent application Ser. No. 10/650,424, filed on Aug. 28, 2003, by Fannon et al., for a METHOD OF MANUFACTURING A FUEL CELL ARRAY AND RELATED ARRAY, which is incorporated by reference herein. That patent describes an injection molding process for a fuel cell array assembly in which a precompression is introduced into the assembly by applying a predetermined surface pressure with flat mold plates acting as compression plates. This precompression is applied in order to reduce the contact resistance of the current collectors of the fuel cell and to achieve a desired hydration characteristic in the MEA. In accordance with that technique, while the precompression is being applied by the compression plates, plastic is injected around the perimeter of the current collectors, and is allowed to cure. The assembly becomes an integrated structure and surface pressure is released. Since the current collector is held by the plastic frame at its perimeter, in such designs, the compression on the current collectors eventually relaxes and the current collectors can take on a 3-dimensional convex shape, with a maximum deflection occurring at the center. As a consequence, a part or all of the applied precompression at the center region is relaxed, which results in increased contact resistance between the current collector and the MEA. A small additional relaxation occurs at the boundaries caused by the stretching of the plastic frame. Maximum deflection is proportional to the third power of the thickness of the current collector. Thus, to avoid some of these disadvantages, the current collectors are made with a comparatively large thickness. These thick current collectors, however, are manufactured by an expensive process at a high cost.

In addition, when the MEA itself begins to relax, an undesired property is its creep characteristic. In a constant strain system, like the fuel cell assembly where the anode and cathode current collectors are structurally connected together at a fixed distance, creep is defined as a drop in load or pressure with time. As the MEA creeps over time, a part or all of the applied precompression is relaxed, which results in increased contact resistance of the fuel cell and less than desirable hydration characteristics of the MEA. These characteristics both reduce the performance of the fuel cell. In addition, leakage of fuel cell working liquid from the anode and cathode can occur where the MEA meets the plastic frame in such systems.

There remains a need, therefore, for a design which addresses the problem of MEA creep such that the compression on the MEA is maintained. There is a further need for a design in which the central portion of the current collector is maintained in its compressed state so that a thinner material can be used for the current collectors.

It is thus an object of the invention to provide a cost effective, highly efficient process for manufacturing a fuel cell or fuel cell array, which allows for the MEA to maintain compression and which allows for the use of thinner current collectors. It is a further object of the invention to provide a fuel cell that does not use heavy screws, bolts and other weighty metal fasteners.

SUMMARY OF THE INVENTION

The deficiencies and disadvantages of prior techniques have been overcome by the techniques of the present invention, which includes providing a spring loaded fuel cell assembly with an injection molded frame and pins. More specifically, the fuel cell includes a series of near flat spring or springs that are placed between the membrane electrode assembly (MEA) of the fuel call and one of the current collectors in the fuel cell. A distribution plate is placed adjacent to the springs in order to distribute the spring compressive load more evenly. The springs and the distribution plate form a spring assembly. Illustratively, the spring assembly is substantially made of metallic materials in order to maintain its shape at the operating temperatures of the fuel cell. However, other suitable materials that do not react with the fuel may also be used. The springs are compressed when the desired pressure is applied. The pressure is further distributed more evenly by the distribution plate, which reduces peak stresses in the fuel cell assembly in operation.

A method of manufacturing the fuel cell containing the spring assembly of the present invention is also provided in accordance with the invention. As noted, the spring assembly is placed in series with the MEA. Thereafter, plates are used to apply a precompression to the fuel cell assembly. Notably, the near flat springs are also compressed during the precompression phase. In accordance with another aspect of the invention, a spring yielding process can be performed during the precompression phase. This yielding process causes the springs reach a yield point prior to the bottoming out of some of the springs, so that substantially all of the springs rebound by approximately the same amount, and thus deflect by approximately the same amount to create a near even force on the MEA.

The compressed state of the spring assembly and the entire fuel cell assembly is then captured by an injection molding process. In order to prepare for the injection molding process, the current collectors and the associated diffusion layers, as well as the MEA, are each provided with correspondingly aligned openings that are designed to receive pins that hold the fuel cell assembly together under compression. In addition, the spring assembly components also include openings for such pins, where needed. More specifically, elastomeric washers are placed on an interior facing side of each current collector over the aligned openings. When the fuel cell components are sandwiched together with the MEA in the center thereof, the silicon washers are joined together at the aligned openings to form sealing columns. Injection molding plastic is then injected into the sealing columns to form plastic center pins, which when the plastic cures, hold the fuel cell assembly together. The pins are injection molded at the same time as a plastic frame is injection molded around the perimeter of the fuel cell. The pins and the frame enable each current collector to maintain its integrity which in turn, allows substantial reduction in the overall thickness needed for the current collectors. This thinner design allows the current collectors to be formed using a lower cost stamping technique rather than a more expensive drilling method. The frame around the perimeter of the MEA seals the anode from the cathode and prevents methanol leakage. When the fuel cell is thereafter in use, and MEA creep begins to occur, the spring assembly forces the distribution plate against the MEA to hold it in a planar configuration. The pins, particularly at the center of the fuel cell, maintain the structural integrity of the current collectors such that the entire fuel cell assembly maintains its precompression state and thereby the deleterious effects of MEA creep are reduced and MEA hydration is optimized.

BRIEF DESCRIPTION OF THE DRAWINGS

The invention description refers to the accompanying drawings in which like reference characters indicate the same components, of which:

FIG. 2B is a schematic illustration of a fuel cell assembly precompression step in accordance with an illustrative embodiment of the present invention;

DETAILED DESCRIPTION OF AN ILLUSTRATIVE EMBODIMENT

Figure 1:
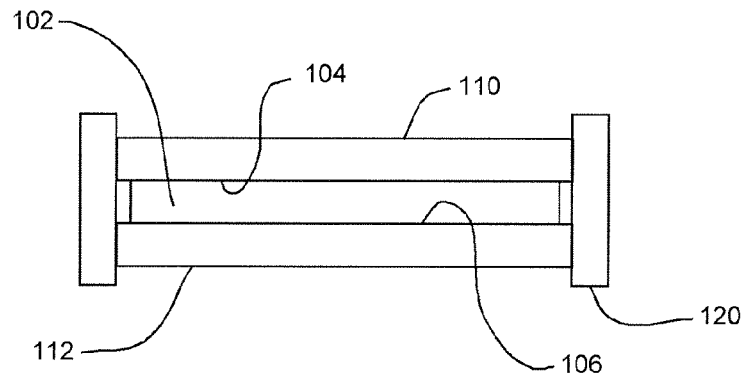
FIG. 1 is a schematic illustration of a fuel cell assembly in accordance with the prior art.

FIG. 1 is a schematic cross section of a fuel cell assembly in accordance with the prior art. The fuel cell assembly 100 includes a membrane electrode assembly (MEA) 102. The MEA 102 typically includes a protonically conductive layer. In a preferred embodiment the layer may be substantially comprised of a material that is a catalyzed membrane, which is commercially available as NAFION®D, a registered trademark of E.I. DuPont de Nemours and Company, a cation exchange membrane based on a polyperfluorosulfonic acid in a variety of thicknesses in equivalent weights. The membrane is typically coated on each of its major surfaces with an electrocatalyst, such as platinum or platinum/ruthenium alloyed particles (not shown). Thus, it is referred to herein as the "catalyzed membrane electrolyte." Those skilled in the art will recognize that a material that conducts protons, but not electrons, can be used in place of the membrane electrolyte.

One face of the membrane electrolyte 102 is the anode face or anode aspect 104. The opposing face of the catalyzed membrane electrolyte 102 is on the cathode side and is herein referred to as the cathode face or cathode aspect 106 of the MEA. Diffusion layers (not shown) are typically comprised of carbon paper, carbon cloth, metallic substances, and/or microporous plastics may be provided on the anode side, the cathode side or on both sides. Some of these components are described in further detail in commonly owned U.S. patent application Ser. No. 10/413,983 by Ren et al., filed on Apr. 15, 2003, for a DIRECT OXIDATION FUEL CELL OPERATING WITH DIRECT FEED OF CONCENTRATED FUEL UNDER PASSIVE WATER MANAGEMENT, which is herein incorporated by reference. The catalyzed membrane electrolyte sandwich may be constructed according to any of the various available fabrication techniques, or other fabrication techniques, while remaining within the scope of the present invention.

The anode current collector 110 and the cathode current collector 112 are used to direct the electrons produced as part of the electricity generating reactions of the fuel cell in accordance with the invention. A spring assembly is provided between the MEA 102 and one of the current collectors as described in further detail herein with reference to FIG. 3. Current collectors 110 and 112 are held in place by a plastic frame 120. Current collectors 110 and 112 are typically disposed along the same plane as, and typically have approximately the same dimensions as the membrane electrolyte or proton conducting layer, however, this need not be the case as long at the current collectors are electrically connected to the proton conducing layer.

Figure 2A:
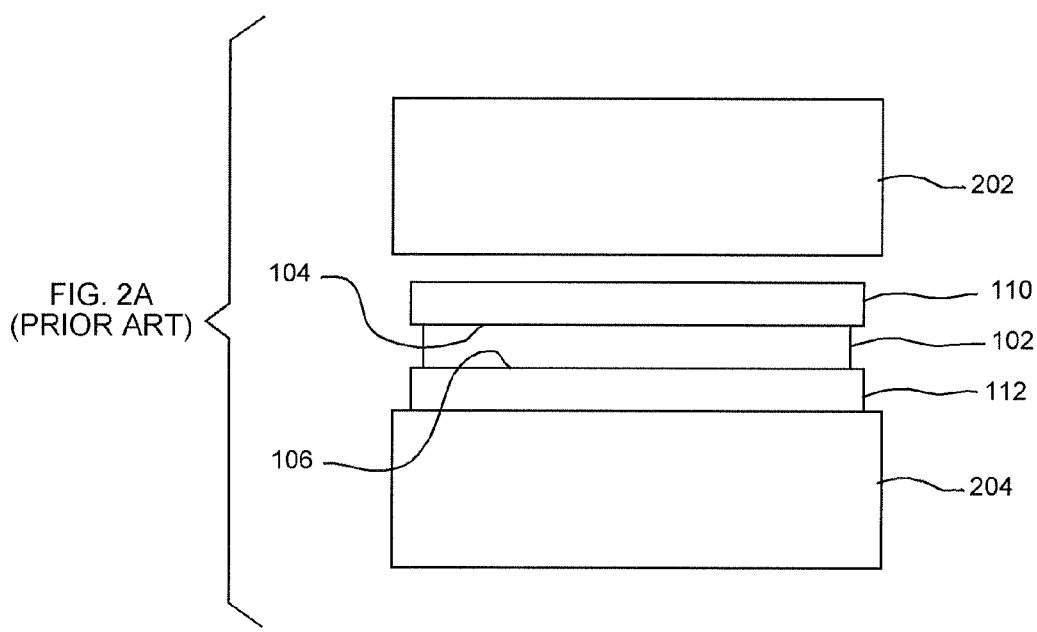
FIG. 2A is a schematic illustration of a fuel cell assembly precompression step in accordance with the prior art.

As noted, a precompression is applied in order to reduce the contact resistance of the current collectors. FIG. 2A illustrates a top compression plate 202 and bottom compression plate 204 that are used to apply a precompression to the assembly by applying a predetermined surface pressure (design pressure) using flat plates 202 and 204 as active compression plates.

While the precompression is being applied, plastic is injected around the perimeter of the current collectors, and the assembly becomes an integrated structure. Thereafter, the surface pressure induced by the compression plates 202, 204 is released. At this point, the current collectors 110 and 112 are held in place only by the plastic frame 120. Thus, as will be understood by those skilled in the art, the anode and cathode current collectors can eventually relax and become convex and the MEA can begin to exhibit creep characteristics, in which the precompression relaxes over time. This is undesirable as described herein before.

The disadvantages of prior techniques are addressed by the apparatus and techniques of the present invention. FIG. 2B illustrates the precompression plates 202 and 204 compressing the fuel cell components; however, in accordance with the invention, a spring assembly 114 is disposed between the cathode current collector 112 and the cathode aspect 106 of the MEA 102.

Figure 3:
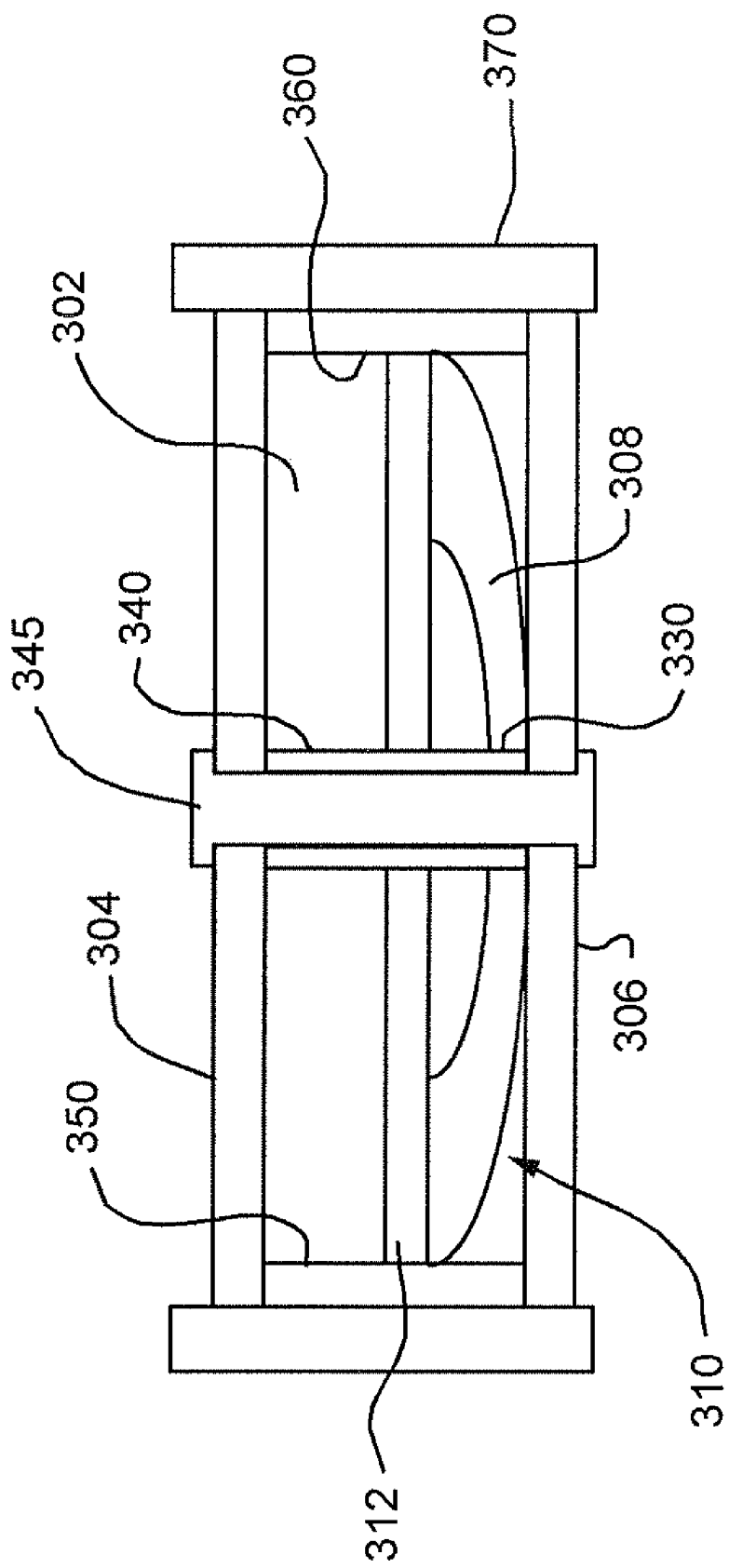
FIG. 3 is a fuel cell assembly with a spring assembly and injection molded frame with pins in accordance with an illustrative embodiment of the present invention.

More specifically, as illustrated in FIG. 3, a fuel cell assembly 300 has an MEA 302 and an anode current collector 304 and a cathode current collector 306. In accordance with the invention, a near-flat cylindrically curved spring 308 is disposed under one of the current collectors in the assembly 300. In accordance with a further aspect of the invention, a spring assembly 310 is comprised of a near flat spring 308 and a distribution plate 312. As noted, the distribution plate 312 further distributes the spring load forces more evenly across the MEA 302. The spring assembly 310 in the embodiment illustrated in FIG. 3 is placed between the cathode current collector 306 and the MEA 302. However, it should be understood that an alternative spring design (such as a coil spring or leaf spring) or an additional spring assembly can be located between the MEA 302 and the anode current collector 304, so that there may be one or more spring assemblies in the fuel cell assembly, within the scope of the present invention. Those skilled in the art will recognize that it may be necessary or desirable to incorporate a flow field between MEA 302 and distribution plate 312, or between MEA 302 and anode current collector 304.

The components of the spring assembly 310 may be illustratively made of metal in order to maintain a lower creep rate at the operating temperatures. Alternatively, other materials may be used that do not react with methanol or other substances in the fuel cell. The springs 308 are designed such they are near-flat when the desired precompression pressure is applied. The near-flat shape of the spring creates much better planar pressure distribution than a spring which contacts the distribution plate at a one or more discrete points, and it also reduces peak stresses in the assembly Over time, as the MEA 302 relaxes due to creep, the spring assembly 310 acts to maintain a significant portion of the overall applied precompression. Since the MEA 302 is still under pressure due to the action of the spring assembly, the MEA creep does not significantly affect the long term performance of the fuel cell. As described in further detail herein, both the spring 308 and the distribution plate 312 may have an open pattern in order to allow methanol to reach the MEA if the spring assembly is disposed on the anode side. Alternatively, if the spring is disposed on the cathode side, as shown in FIG. 3, the spring may be designed so as to allow the flow of oxygen or air to the cathode side of the MEA.

Figure 4A:
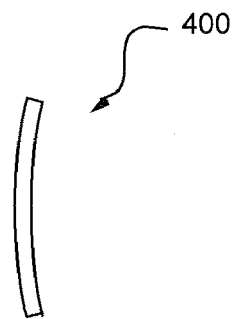
FIG. 4A is an end view of a single spring for use within the spring assembly in accordance with one illustrative embodiment of the present invention.
Figure 4B:
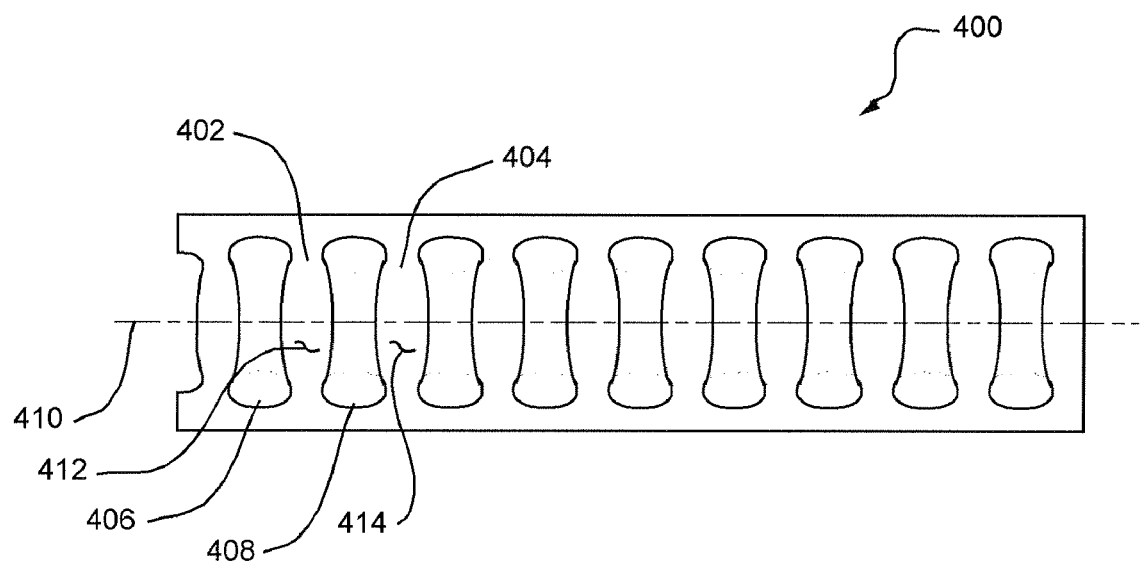
FIG. 4B is a top plan view of the spring of FIG. 4A.

FIG. 4A illustrates one embodiment of a spring in accordance with the invention from an end view, and FIG. 4B illustrates the same spring in a top plan view. Those skilled in the art will recognize that a similar effect can be achieved with a plurality of springs, or where the springs are connected at different points. These variations are described by way of further illustration and not limitation, and are within the scope of the invention. The spring 400 of FIGS. 4A and 4Bb has individual beam sections 402 and 404. The beams 402 and 404 are separated by openings 406, 408. Illustratively, the beams 402, 404 are thicker in the center 412, 414 when measured along the centerline of the spring, such as illustrated by the arrow 410, than at the ends. This design achieves a substantially constant bending stress.

In order to provide further advantages, the spring 400 may be prestressed during manufacture, as described in further detail herein with respect to the method of the present invention.

Figure 5A:
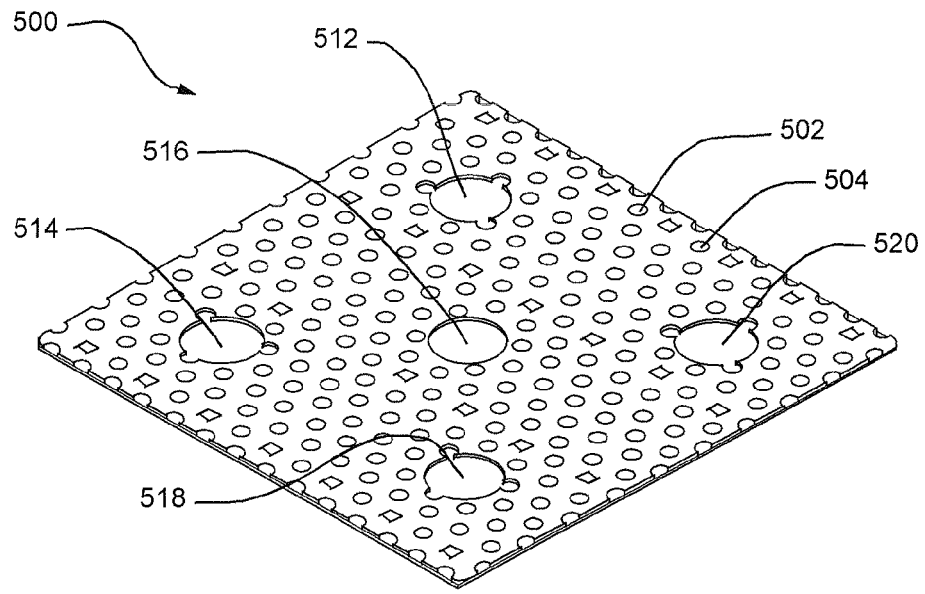
FIG. 5A is an isometric elevation of an illustrative embodiment of a distribution plate of the present invention.
Figure 5B:
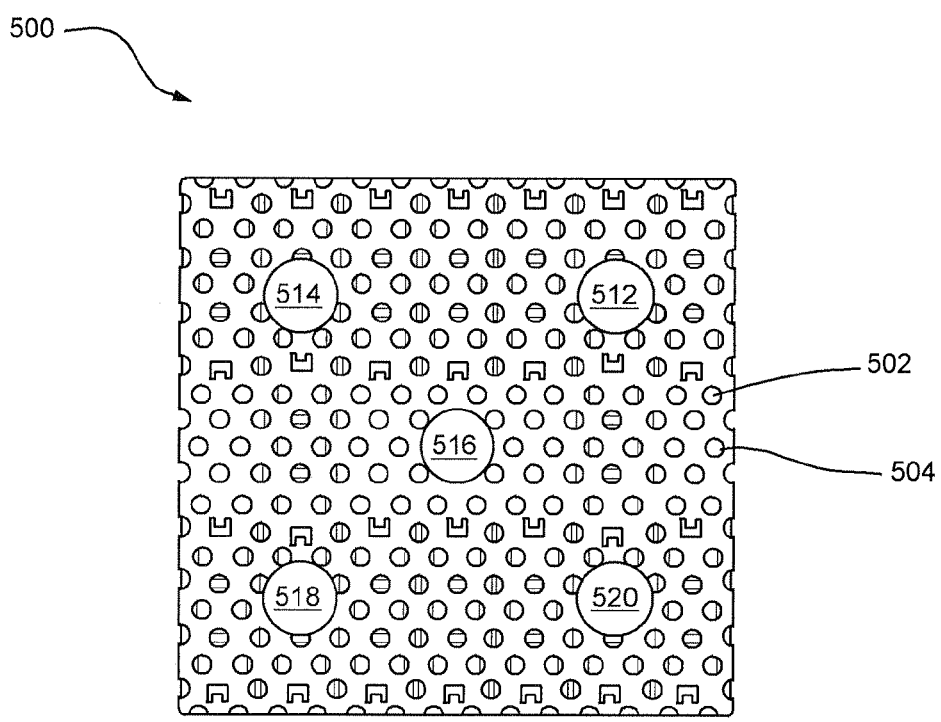
FIG. 5B is a top plan view of the distribution plate of FIG. 5A.

Still further advantages maybe provided when the one or more springs are used with a distribution plate in order to more uniformly distribute the spring forces along the MEA. More specifically, FIG. 5A illustrates a distribution plate 500. The plate 500 has a plurality of pores 502, 504 formed therein to allow for the flow of reactants therethrough. In addition, the distribute plate includes larger holes 512, 514, 516, 518 and 520 through which the injection molded pins, described further hereinafter, are passed. FIG. 5B is a top plan view of the distribution plate 500.

Figure 5C:
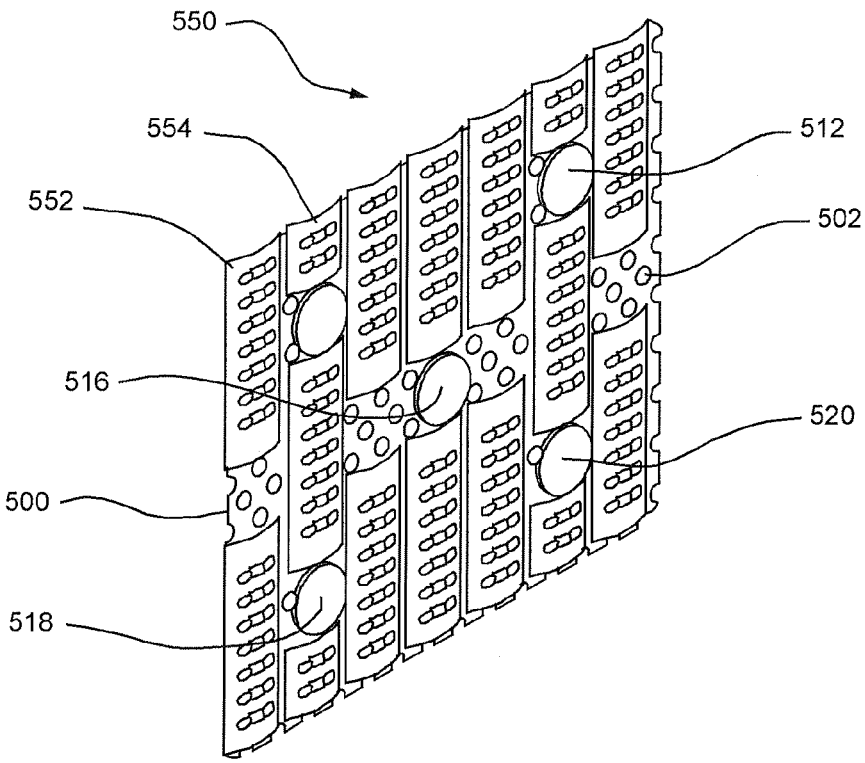
FIG. 5C is an isometric elevation of an illustrative embodiment of the spring assembly of the present invention.
Figure 5D:
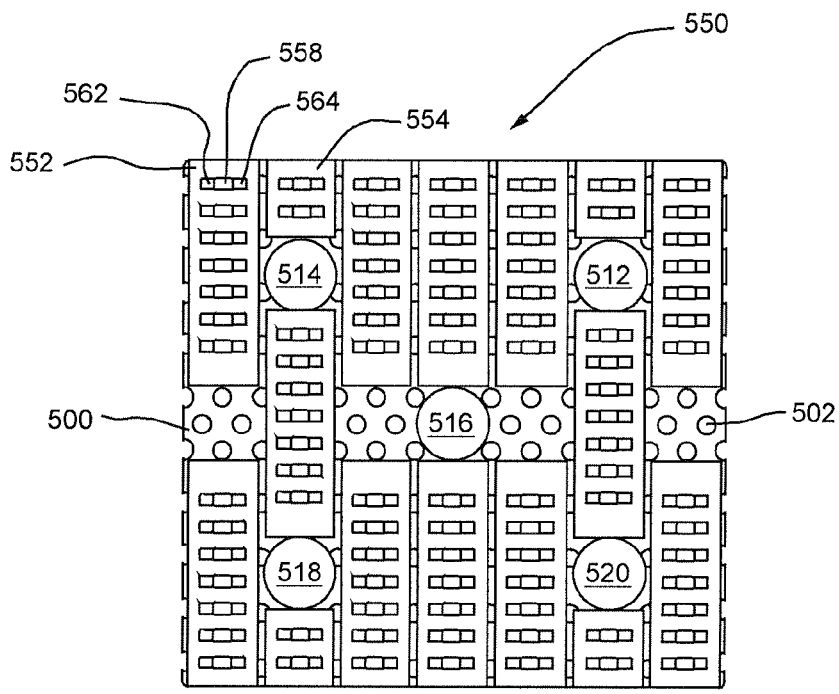
FIG. 5D is a top plan view of the spring assembly of FIG. 5C.

In accordance with one embodiment of the invention, a plurality of springs are provided over a distribution plate to provide adequate compression to counter the effects of precompression relaxations. FIG. 5C is an isometric elevation of a spring assembly 550. The spring assembly 550 includes twelve individual springs, such as the springs 552 and 554 which are each similar to the spring of FIG. 4B, and which are cut to different lengths to accommodate other features of the assembly 550. The springs are placed contiguous to a distribution plate 500. As noted, the distribution plate 500 includes smaller pores 502 to allow the passage of fuel or oxygen therethrough. In addition, the distribution plate 500 includes openings 512-520 (optional) for the pins that may be used to further improve compression, as will be described in further detail herein. As noted with respect to FIGS. 4A and 4B, the springs have openings therein as well. Illustratively, such openings in the springs can be aligned with the pores in the distribution plate 500. For example, the opening 558 in spring 552 is aligned with the pores 562, 564 in the distribution plate 500, as shown in FIG. 5D. This allows for better flow of reactants to and from the MEA. Notably, the spring assembly 550 is placed contiguous to either the cathode current collector or the anode current collector and is not pinned down at its perimeter by the plastic perimeter frame, thus allowing the springs to expand as the MEA creeps. Illustratively, the spring assembly 550 is of a constant stress design.

Figure 6:
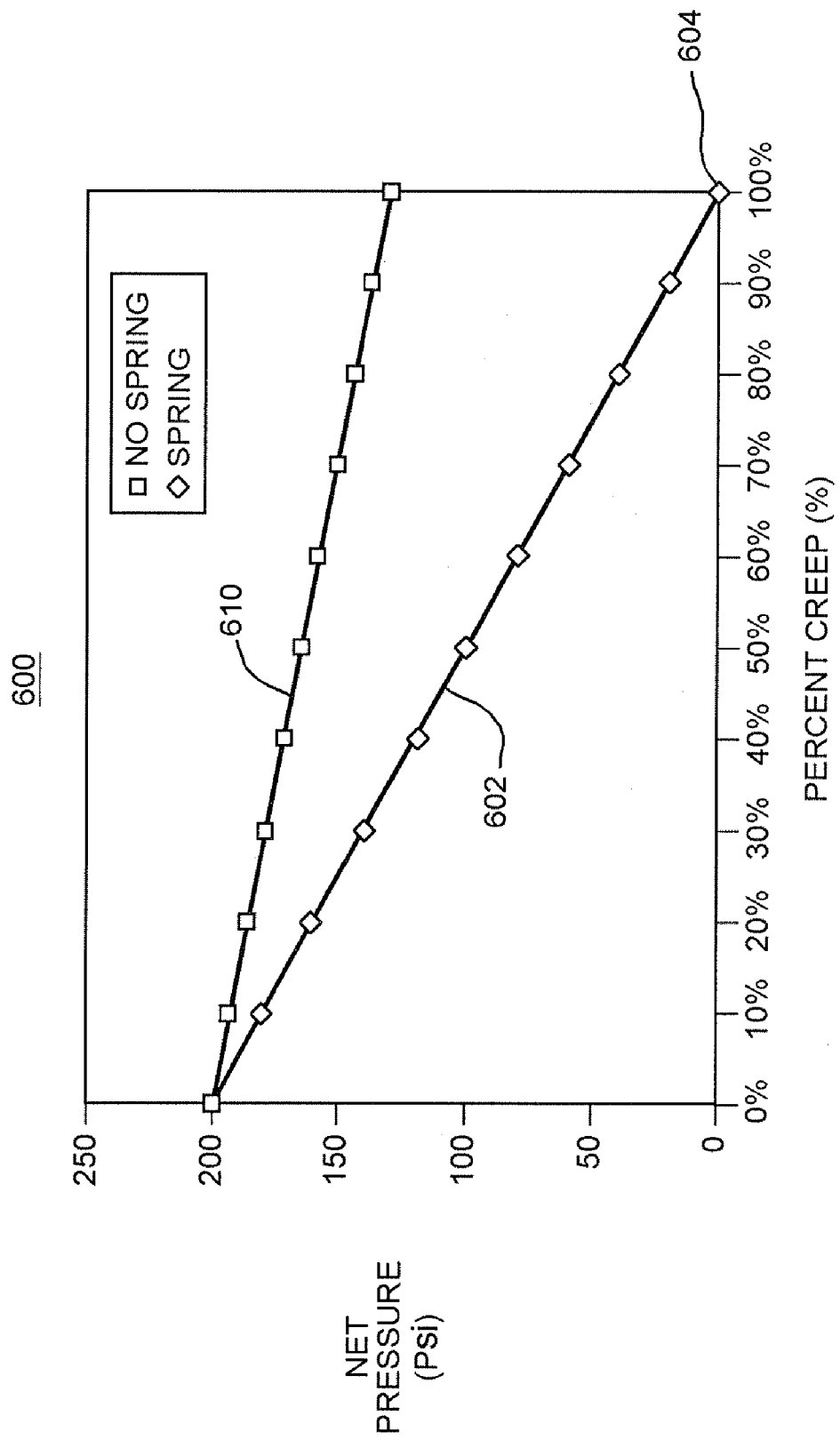
FIG. 6 is a graph of net pressure in pounds per square inch (PSI) versus percentage of MEA creep, which illustrates the effects of the spring assembly of the present invention.

FIG. 6 illustrates a graph 600 of a percentage of MEA creep on the x-axis versus net pressure in pounds per square inch (PSI) on the y-axis. The first line 602 (with diamonds) illustrates the creep of the MEA without a spring and as is apparent at point 604, when there is 100% creep, there is zero pressure on the MEA. The curve 610 (with squares), on the other hand, illustrates the MEA with a spring in accordance with the invention. As shown, even with 100% relaxation, the MEA with the spring assembly has not experienced a complete decrease in pressure that had resulted without the spring, In fact, the pressure applied to the MEA with the spring never approaches zero pressure.

Figure 7:
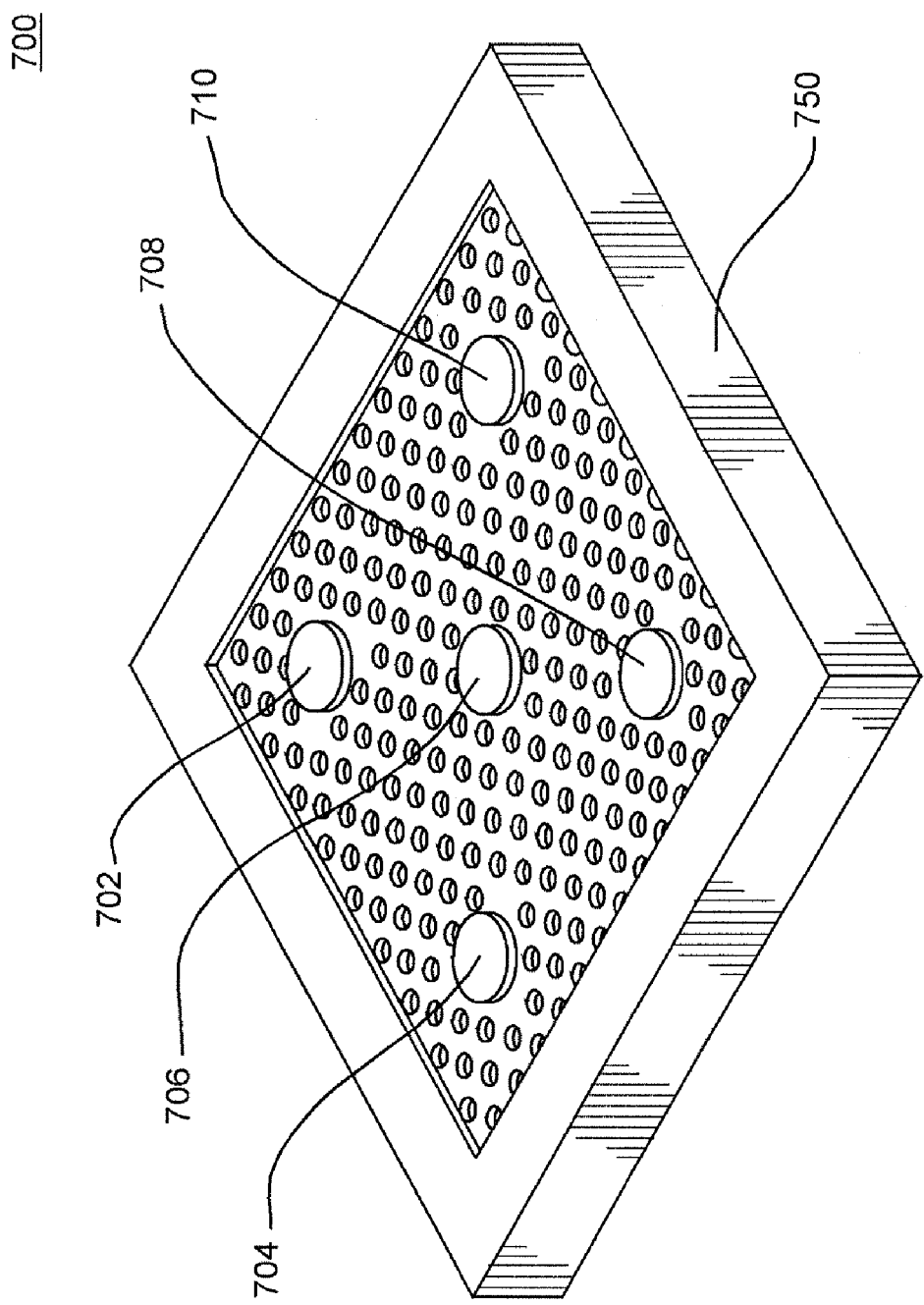
FIG. 7 is an isometric elevation of the fuel cell assembly in accordance with an illustrative embodiment of the present invention, depicting the pins and frame as injection molded around the fuel cell assembly.

In accordance with a further aspect of the invention, the MEA sandwich, the spring assembly and the current collectors are held together with a one or more structural elements to mechanically connect the anode and cathode current collectors together, this is typically a mechanical, not an electrical, connection and is illustratively a plurality of pins and a perimeter frame that are created using an injection molding technique in accordance with the present invention. More specifically, FIG. 7 illustrates a fuel cell assembly 700, which has five pins 702 through 710 which mechanically connect the anode and cathode current collectors to provide additional compression. The pins 702-710 pass through corresponding apertures in the MEA, the distribution plate (if any), the springs and the current collectors to connect the anode current collector to the cathode current collector, and to apply pressure to the MEA. The aligned pores, holes and openings discussed previously are formed at one or more locations in the components during manufacture, using methods known to those skilled in the art. Similarly aligned holes are also located in the MEA layer (not shown in FIG. 7), which align with the holes in the current collectors. During the injection molding process as described further in detail herein, pins are injection molded into and through the holes 702 through 710 and in the same process a plastic frame 750 is formed around the perimeter of the fuel cell to form the fuel cell assembly 700.

The centrally located pins result in the dramatic reduction of the maximum deflection of the current collectors, which leads to a fuel cell design that can employ thinner current collectors. Employing thinner current collectors has the advantage that the same current collectors can be stamped as opposed to machined, and this results in significant cost reduction. Furthermore, since a portion of the applied precompression force is held by the center pins, the tensile stress on the plastic frame 750 at the perimeter is reduced. This allows the plastic frame to be reduced in size which maximizes the footprint efficiency of the fuel cell in such a manner that the active surface area of the MEA is, on a percentage basis, increased because it allows for the use of a smaller perimeter plastic frame.

Figure 8:
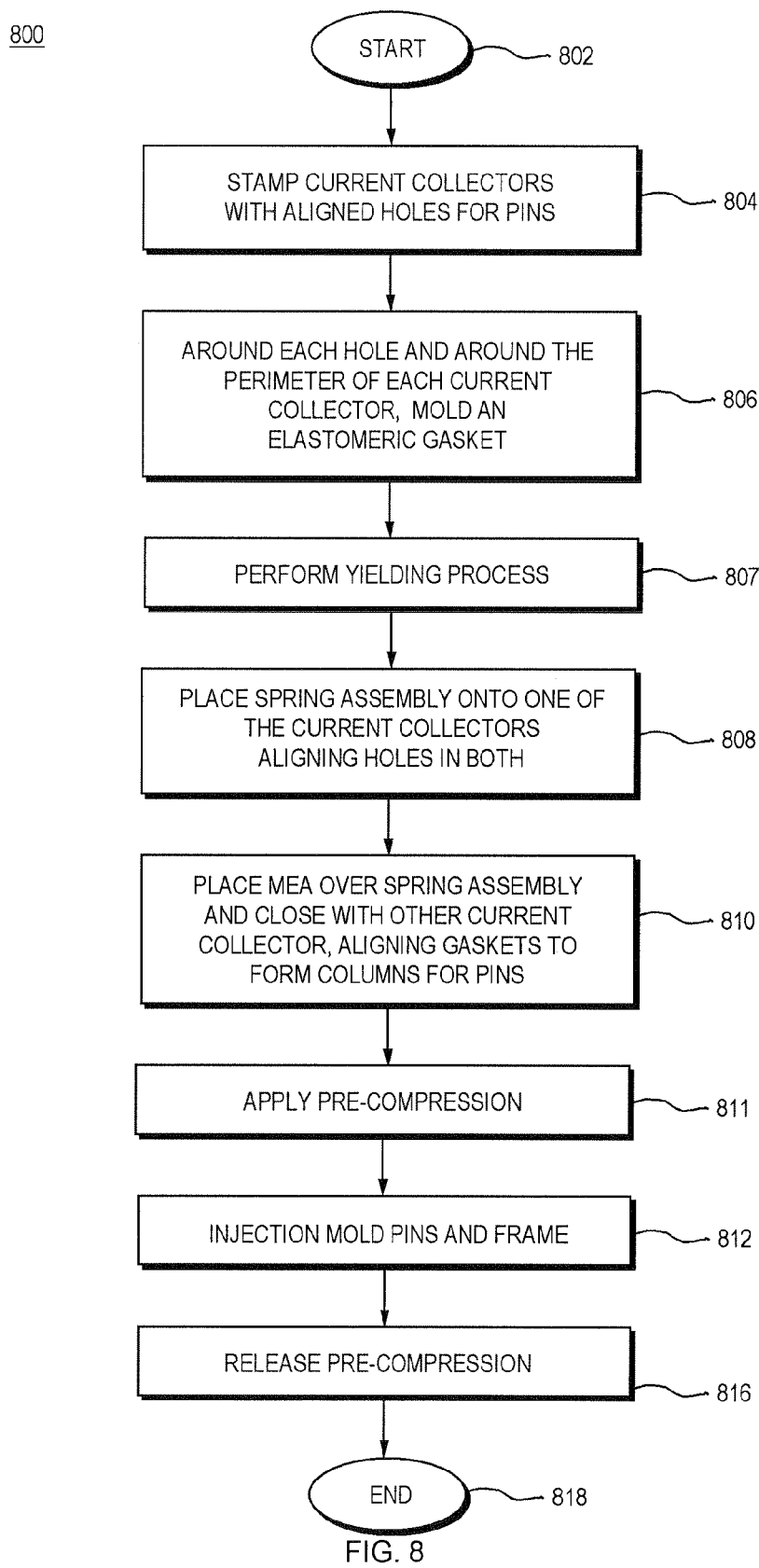
FIG. 8 is a flow chart of a procedure in accordance with a method of the present invention

FIG. 8 is a flow chart of a procedure 800 which illustrates the injection molding process in accordance with the present invention. The procedure starts with step 802 and continues to step 804, in which thin current collectors are stamped with aligned holes for the pins and other openings for the fluids needed for the electrochemical reactions to proceed within the fuel cell. After the current collectors have been manufactured and prepared, an elastomeric gasket is injection molded or otherwise inserted into each of the holes in each current collector and around the perimeter of the current collector as shown in step 806. The elastomeric gaskets may, by way of example and not limitation, be comprised of silicone.

Thereafter, in step 808 the spring assembly is placed adjacent to one of the current collectors while aligning the holes in both the spring assembly and the gaskets.

This may be appreciated with reference to FIG. 3, which illustrates the spring assembly 310 and the central gasket 330 on cathode current collector 306, for example. Returning to the flow chart of FIG. 8A, in accordance with step 810, the MEA is placed over the spring assembly and then the entire fuel cell assembly is closed with the other current collector in such a manner that the gaskets are aligned on both current collectors to form sealing columns for the pins, and to seal the perimeter. For example, as may be seen in FIG. 3, gasket 330 on the cathode current collector matches and aligns with gasket 340 on the anode current collector 304 to form a sealing column into which the pin 345 is injection molded, as described further hereinafter. Sealing columns are also formed at each end of the fuel cell assembly 300, such as the sealing column 350 and the sealing column 360 which seal off the perimeter frame 370. Any structural plastic with sufficient material strength may be used for the pins and the frame. Illustratively, the pins and/or frame may be substantially comprised of a polyphenylene sulfide material sold commercially as RYTON® PPS by the Chevron Phillips Chemical Company, LLC of The Woodlands, Tex., USA. In an illustrative embodiment, five pins are used, one near each corner and a one near the geometric center of the assembly. However, it should be understood by those skilled in the art that any number of pins can be utilized as may be desired in a particular application of the invention. It is further understood by those skilled in the art that it is preferred that a gasket or sealing column is formulated prior to injection molding of the pin in order to prevent the plastic used to form the pin from spilling into and deactivating or otherwise compromising the MEA.

The procedure continues to step 811, in which precompression is applied to place the components under pressure. During the precompression phase, in accordance with a further aspect of the invention, it may also be desirable to perform a spring yielding process to change the free height of the springs so that each spring exhibits substantially the same spring characteristics during fuel cell operation such that there is a uniform loading on the MEA.

More specifically, as will be understood by those skilled in the art, the yield strength, or the yield point, is defined in engineering and materials science as the stress at which a material begins to plastically deform. Prior to the yield point, the material will deform elastically and will return to its original shape when the applied stress is removed. Once the yield point is passed some fraction of the deformation will be permanent and non-reversible.

Figure 9:
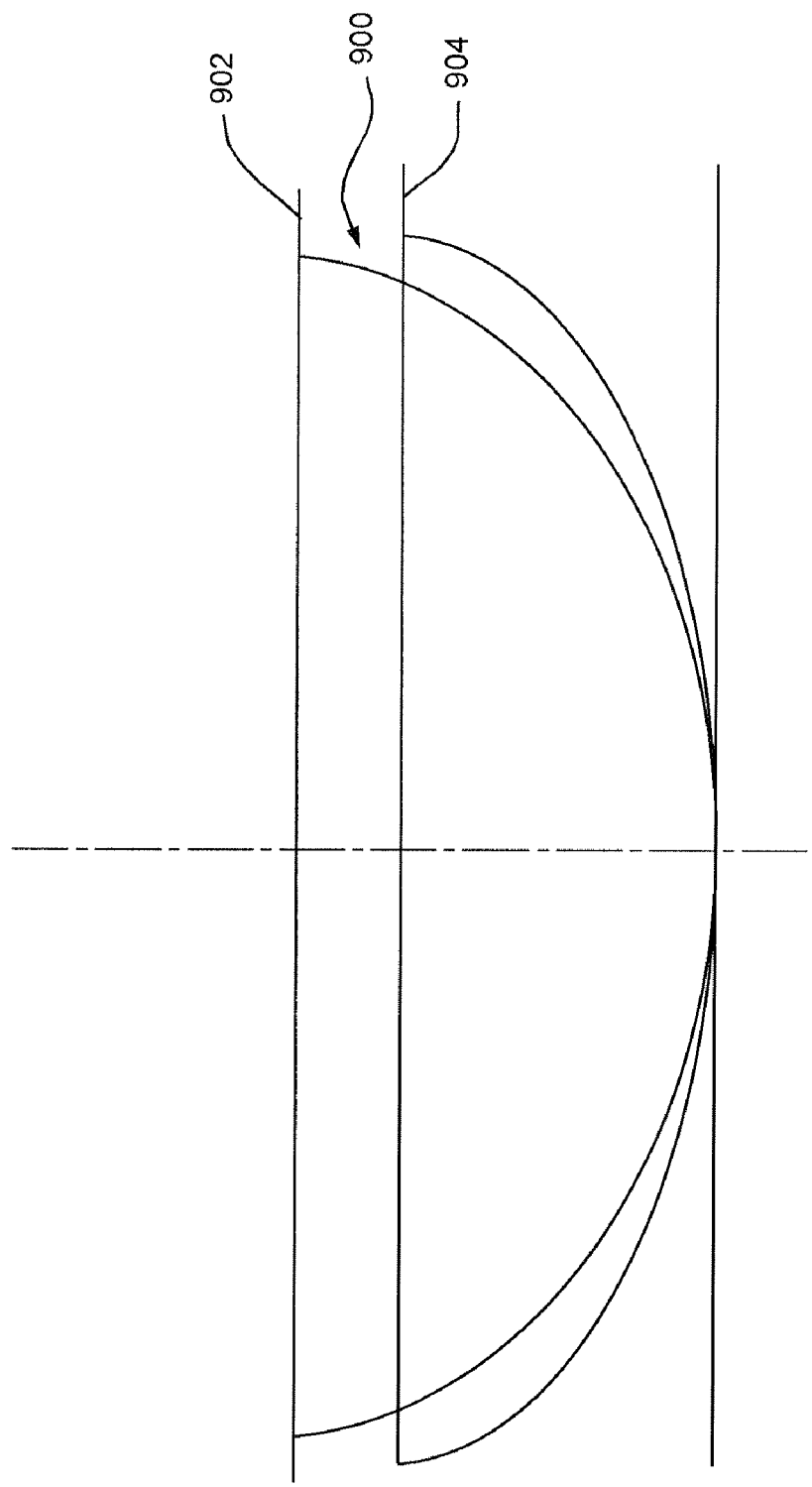
FIG. 9 is a schematic illustration depicting a spring at its free height and the same spring as deflected in a yielding process in accordance with the method of the present invention.

In the present application, a more even loading on the MEA will be gained if the springs are designed with a free height higher than the elastic limit such that when pressed flat they will yield. This yielding of the springs can be induced during the precompression step in the molding operation of the cell. By way of illustration, FIG. 9 depicts a spring 900 which at it free height has the dimension shown by reference character 902. When the spring is deflected past its yield point, it returns, not to its original free height 902, but to a lower height 904 ("sprung height").

There are at least two advantages of designing the springs to yield during the precompression step in the molding process: the first is that a near even MEA loading is thus provided, even when the current collectors are deflecting. In other words, if none of the springs yielded during assembly then the springs under the portion of the current collectors that are most deflected i.e., those areas not adjacent to either a pin or the plastic perimeter frame, will have less load than the springs under the portion of the current collectors that are held near the plastic pins or the frame. This uneven load can result in variation in performance across the MEA.

According to the invention, a representative current collector deflection can occur during the molding process by designing the mold to push on the metal current collectors in the same area the plastic will be holding the current collectors once the part is molded. If all of the springs reach the yield point prior to the bottoming out of some of the springs then all will rebound by approximately the same amount. Thus, when the correct force is then applied, all of the springs will deflect approximately the same amount creating a near even pressure on the MEA.

This advantage becomes even more significant when the current collector deflection becomes a high percentage of the overall spring deflection. For instance, if the spring only deflects 0.010" under load and the current collector deflection in a specific area is 0.005" there will be significantly less load on that portion of the MEA in that specific area. But, performing a yielding process in accordance with the invention, such that all of the springs deflect approximately the same amount, creates a near even force on the MEA.

The second advantage of allowing the springs to yield is to reduce the tolerance on the free height of the spring assembly. Tight tolerances usually result in an increase component cost. In design of components such as in the illustrative embodiment of the invention, there is small total deflection to begin with, and thus the tolerance can account for a substantial variation in the intended design loading. For this reason, there are tight tolerances required, which in turn thereby increase component cost. By designing the springs to yield in accordance with the present invention, the springs can be formed with a comparatively wide tolerance knowing that even the lowest free height spring will yield to provide substantially the same force as the highest free height spring, within tolerance limits. This will result in a lower cost spring assembly that is robust to free height changes.

It should be appreciated that the yielding process could also be performed prior to the precompression step, while remaining with the scope of the present invention.

Returning to the flow chart of FIG. 8, the procedure continues to step 812, in which the pins and frame are substantially simultaneously injection molded through the sealing columns, as described with reference to FIG. 3. The pins, and the plastic perimeter are injection molded around the edges of the fuel cell assembly in order to maintain the components in their desired configuration. Due to the presence of the pins, the dimensions of the plastic perimeter can be reduced, which thereby results in a greater active surface area of the MEA being exposed, as described herein. Once the plastic has cooled and cured the precompression is released as in step 816 and when creep begins to occur, the spring assembly expands to compensate for the MEA creep that occurs due to precompression relaxation.

It should be understood that the present invention has many advantages which include the reduction of the effects of MEA creep characteristics. The compression is maintained by the spring assembly of the present invention. In addition, the method of manufacturing the fuel cell assembly in accordance with the present invention, using the pin and frame assembly, allows for thinner current collectors that can be produced by a stamping procedure which simplifies and reduces the cost of manufacture. The result is a fuel cell assembly which has lower manufacturing costs and improved performance of the MEA and fuel cell system, especially when measured over time.

The foregoing description has been directed to specific embodiments of the invention. It will be apparent, however, that other variations and modifications may be made to the described embodiments with the attainment of some or all of the advantages of such. Therefore, it is an object of the appended claims to cover all such variations and modifications as come within the true spirit and scope of the invention.

What is claimed is:

1. A method of fabricating a fuel cell assembly, comprising:
   A. providing at least one proton conducting layer, having an anode aspect and a cathode aspect, and a planar anode current collector that is electrically connected to said anode aspect of the proton conducting layer, and a planar cathode current collector that is electrically connected to the cathode aspect of the proton conducting layer, and said proton conducting layer and each of said current collectors having at least one centrally disposed opening therein;
   B. disposing a spring assembly, comprised of a distribution plate and one or more springs, adjacent to one of said current collectors to apply pressure to the proton conducting layer, wherein the one or more springs are between the distribution plate and the adjacent current collector;
   C. providing a structural means to mechanically, but not electrically connect the anode and cathode current collectors;
   D. assembling the proton conducting layer, said spring assembly and said current collectors into the fuel cell assembly such that said structural means being of an elastomeric material passes through at least one centrally disposed opening in said anode current collector, and a plurality of other openings disposed proximate to one or more edges at the perimeter of the proton conducting layer through the proton conducting layer, from the anode to the cathode aspect of the of the proton conducting layer;
   F. applying pre-compression to the proton conducting layer, the spring assembly and the current collectors; and
   G. injection molding a frame around the perimeter of the fuel cell assembly providing uniformity of compression, uniformity of reactant flow and which maintains said compression.

2. The method as defined in claim 1, further comprising providing a first catalyst adjacent to the anode aspect of the proton conducting layer, and a second catalyst adjacent to the cathode aspect of the proton conducting layer.

3. The method as defined in claim 2, further comprising providing a diffusion layer between one or more current collectors and the proton conducting layer.

4. The method as defined in claim 1, wherein the anode and cathode current collectors have a plurality of centrally disposed openings therein, and the structural means is formed by placing a first gasket around each respective opening in the anode current collector and a corresponding second gasket, which matches and aligns with the first gasket at each respective opening in the cathode current collector, said gaskets forming sealing columns.

5. The method as defined in claim 4, further comprising injection molding pins through said sealing columns, such that the pins mechanically connect together the anode and cathode collectors, and pins at the centrally disposed openings maintain a central portion of the current collector in its compressed state.

6. The method as defined in claim 5, wherein injection molding of the pins and frame are accomplished substantially simultaneously.

7. The method as defined in claim 6, further comprising providing a mold for compressing the current collectors, spring assembly and proton conducting layer prior to injection molding.

8. The method as defined in claim 1 further comprising inducing a yielding of the one or more springs during a pre-compression stage of a molding process.

9. The method as defined in claim 1, further comprising an additional spring assembly adjacent to the other of said current collectors.

10. A method of fabricating a fuel cell assembly comprised of:
    A. providing at least one proton conducting layer, having an anode aspect and a cathode aspect, and an anode current collector that is electrically connected to said anode aspect of the proton conducting layer, and a cathode current collector that is electrically connected to the cathode aspect of the proton conducting layer, and said proton conducting layer and each of said current collectors having at least one opening;

B. disposing a spring assembly, comprised of a distribution plate and a plurality of springs, adjacent to one of said current collectors, wherein said springs are between the distribution plate and the adjacent current collector, said distribution plate for uniformly distributing spring forces along the proton conducting layer, said proton conducting layer, said spring assembly and said current collectors forming a fuel cell assembly;

C. assembling the proton conducting layer, spring assembly and current collectors comprising a fuel cell assembly such that the spring assembly applies compression to the proton conducting layer;

D. placing the proton conducting layer, the spring assembly, and the current collectors under pre-compression by mold plates;

E. injection molding a frame around the perimeter of the fuel cell assembly providing uniformity of compression, uniformity of reactant flow and which maintains said compression; and F. molding elastomeric pins into sealing columns, formed from elastomeric gaskets and a first pin being centrally disposed, and a plurality of pins located generally near each respective corner of the fuel cell assembly.

11. The method as defined in claim 10, further comprising providing a catalyst adjacent to the proton conducting layer.

12. The method as defined in claim 10, further comprising providing a diffusion layer between the current collector and the proton conducting layer.

13. The method as defined in claim 10, further comprising injection molding pins through the anode current collector to the cathode current collector, and injection molding a frame around the perimeter of the fuel cell assembly including the proton conducting layer, spring assembly, and the current collectors, said injection molding of said pins and said frame being accomplished substantially simultaneously.

14. The method as defined in claim 10 further comprising inducing yielding of the springs during a pre-compression stage of a molding process.

15. The method as defined in claim 10 wherein said injection molding further comprising:
fabricating said first and second current collectors by stamping said first and second current collectors with a plurality of holes, each current collector having a set of holes being aligned with those of the other current collector and wherein each of said first and second current collectors are planar in shape and have at least one centrally disposed opening therein, and a plurality of openings disposed around the perimeter thereof.

16. The method as defined in claim 10, further comprising an additional spring assembly adjacent to the other of said current collectors.

* * * * *